Figures 1, 2:
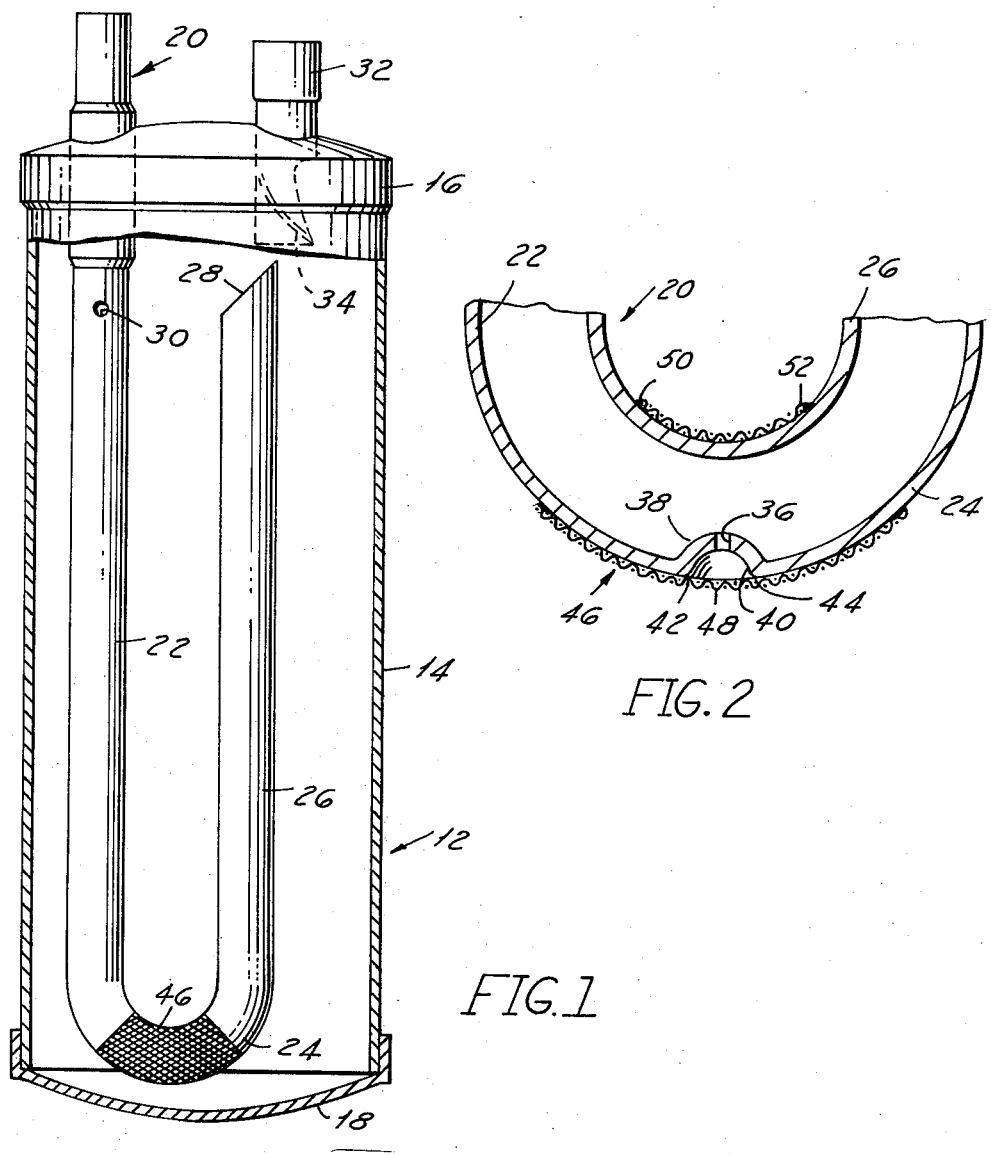

United States Patent [19]
Bottum

[11] 3,872,689
[45] Mar. 25, 1975

[54] SUCTION ACCUMULATOR

[76] Inventor: Edward W. Bottum, 9357 Spencer Rd., Brighton, Mich. 48116

[22] Filed: May 2, 1974

[21] Appl. No.: 466,202

[52] U.S. Cl. .................................................. 62/503
[51] Int. Cl. ............................................ F25b 43/00
[58] Field of Search ...................................... 62/503

[56] References Cited
UNITED STATES PATENTS

| 2,953,906 | 9/1960 | Quick | 62/503 |
|---|---|---|---|
| 3,212,289 | 10/1965 | Bottum | 62/503 |
| 3,643,465 | 2/1972 | Bottum | 62/503 |

Primary Examiner—Meyer Perlin
Attorney, Agent, or Firm—Whittemore, Hulbert & Belknap

[57] ABSTRACT

A suction accumulator is provided for the compressor of a refrigeration system. The accumulator comprises a casing having an inlet and an outlet. A conduit is provided within the casing having an open end adjacent the upper portion of the casing and having a portion extending from said open end to a point adjacent the bottom of the casing and thence to the casing outlet. The conduit has a metering opening adjacent the bottom of the casing. The conduit acts to draw gas through the open end and draw liquid at a controlled rate through the metering opening and expel both the gas and the liquid into the casing outlet. A strainer structure is provided over the metering opening.

3 Claims, 2 Drawing Figures

PATENTED MAR 25 1975  3,872,689

SUCTION ACCUMULATOR

BACKGROUND OF THE INVENTION

The present invention relates to an improvement in suction accumulators for the compressor of a refrigeration system. Examples of such accumulators may be found in U.S. Pat. Nos. 3,084,523; 3,212,289; 3,420,071, 3,443,367; 3,563,053; and others. Such accumulators generally are provided for the compressor of a refrigeration system. They include a casing having an inlet and outlet. In the most usual application, a U-shaped conduit is provided within the casing. One leg of the conduit extends from a point adjacent the bottom of the casing to the casing outlet. The other leg extends from the casing bottom and terminates in an open end within the casing. A metering opening is provided in the bend of the U-shaped conduit to meter liquid refrigerant into the conduit. The open-end leg is adapted to receive gaseous refrigerant which passes through the U-shaped conduit and on to the compressor of the system.

It is desirable to provide a strainer element over the metering opening as set forth in U.S. Pat. Nos. 3,012,414 and 3,212,289. The strainer is generally a foraminous material, such as a screen, which acts to filter any foreign particles which may be present in the liquid refrigerant. It is desired that the total area of the screen be considerably larger than the area of the metered opening so that the screen is capable of collecting a relatively large amount of foreign matter. The amount of material which a larger screen can collect before being clogged is much greater than the amount of material which would cause clogging of the metering opening. Additionally, during the process of use of the accumulator, much of the material collected by the screen will fall off the screen and settle in the bottom of the accumulator thereby virtually eliminating the problem of clogging in connection with the metering opening. An advantage of using a strainer is, of course, that the material which flows from the accumulator to the compressor is free from foreign matter which might cause damage or clogging of the compressor.

In the past, where a strainer element has been used for the metering opening, it has frequently been an elongated sleeve-type unit having a closed outer end and an open inner end. The open inner end has been secured to the conduit in which the metering opening is provided. This arrangement provides the desired large strainer surface but results in a relatively expensive manufacturing process requiring considerable hand labor. Further, quality control is difficult to maintain with such a structure. The present invention provides a simple sleeve-type screen which slips over the conduit and is located over the metering opening. The metering opening is provided in a recess in the conduit wall so that the outer mouth of the recess provides a screening area considerably larger than the actual area of the metering opening.

SUMMARY OF THE INVENTION

A suction accumulator for the compressor of a refrigeration system is provided. The accumulator comprises a casing having an inlet and an outlet. A conduit is provided within the casing having an open end adjacent the upper portion of the casing and having a portion extending from said open end to a point adjacent the bottom of the casing and thence to the casing outlet. The conduit has a metering opening adjacent the bottom of the casing. The conduit acts to draw gas through the open end thereof and draw liquid at a controlled rate through the metering opening therein and expel both the gas and the liquid into the casing outlet. The accumulator includes an improvement comprising a radially inwardly directed recess in a wall portion of the conduit adjacent the bottom of the casing. The metering opening is located within said recess. A sleeve-shaped strainer element is received on said conduit and positioned adjacent the bottom of the casing in a location where a portion of the strainer element overlies the recess so as to filter fluid through the strainer before it passes through the metering opening. In the Drawings FIG. 1 is an elevational view partially in section of one embodiment of the suction accumulator of the present invention; and FIG. 2 is an enlarged view in section of the lower portion of the U-shaped tube provided in the suction accumulator.

As illustrated in FIGS. 1 and 2, the suction accumulator 10 includes a casing 12 which comprises an open-ended tube 14 having an upper end closure 16 and a lower end closure 18 secured thereto as by brazing to result in a fluid-tight casing.

An outlet tube 20 extends through the upper end closure 16. The outlet tube 20 is U-shaped. One leg 22 of the tube 20 extends downwardly to a point adjacent the lower end closure 18. The tube is then provided with a bend 24 and a second leg 26 extends upwardly and terminates in an open end 28 adjacent the upper end closure 16. An opening 30 is provided in leg 22 at the upper end to equalize pressure in both of the legs 22, 26.

An inlet tube 32 extends for a short distance into the casing 12. One wall portion 34 of the tube 32 is deformed inwardly into the tube 32 to form a scoop for directing the flow of incoming fluid into the casing. In forming the wall portion 34, the tube 32 is first slit for approximately half the circumference of the tube. The wall portion 34 is then deformed inwardly in the general shape of a curved scoop. Incoming fluid impinges against the wall portion 34 and is directed in a curved path to exit from the tube at approximately right angles to the longitudinal axis of the tube and generally tangentially to the inner surface of the casing tube 14.

In operation of the accumulator, cold refrigerant gas having a small amount of entrained liquid refrigerant therein enters the accumulator through the inlet tube 32. The incoming gases, which move at a relatively high velocity, are directed tangentially against the inner wall of the casing and follow a circular path around the casing interior. The gases are then free to expand, with resultant reduction of the velocity thereof. As a consequence, incoming gases are not directed as a high-speed jet against any liquid which may be retained in the lower portion of the casing 12. This prevents turbulence of the liquid which may result in objectionable foaming and also prevents splashing of liquid into the open end 28 of the U-shaped tube 20. The introduction of liquid into the U-shaped tube through the open 28 by splashing is undesirable because it is desired to control the rate at which liquid enters the U-shaped tube.

The refrigerant gases which enter the casing are drawn into the open end 28 of the U-shaped tube 20, pass through both legs of the U-shaped tube and exit via the leg 22. The gases are passed from the U-tube to the compressor of the refrigeration system (not shown). The compressor which creates a suction, draws the gaseous refrigerant through the accumulator at a relatively rapid rate.

During operation of the refrigeration system, there are times when an unusual amount of refrigerant will collect in the accumulator. For example, when the system is shut off, such as is the case with an intermittently operated air conditioning system, the refrigerant tends to condense in the entire system and collect in the accumulator. A similar situation may occur when the system is operated under low load conditions.

Liquid refrigerant is metered out of the casing 12 by means of a small metering opening 36 provided in the tube bend 24. Liquid refrigerant which enters the accumulator through the inlet tube 32 drops to the bottom of the accumulator and is subsequently drawn through the opening 36 and then through the leg 22 and out of the accumulator. It will be appreciated that the liquid which is metered into the leg 22 is entrained in the stream of gaseous refrigerant. It remains entrained in the gas as it passes from the accumulator and is drawn to the compressor of the system. The opening 36 acts as a restriction and causes liquid refrigerant to be metered into the compressor at a controlled rate. The accumulator thus acts to prevent large amounts of liquid refrigerant from suddenly entering the compressor. Such sudden surges of liquid may result in seriously damaging the compressor.

In the past, a simple opening has been punched or otherwise formed in the tube bend 24. However, it has been found desirable to provide a strainer or filter over the opening 36 to prevent foreign substances from plugging the metering orifice.

Problems have been encountered in placing a strainer directly over a metering opening which is formed in a wall of the tube bend 24. It will be appreciated that because of the small size of the metering opening, if such opening is placed directly against a filter, only a very small area is available for filtering, the area being determined by the diameter of the metering opening. One solution to this problem in the past has been to provide a relatively long sleeve-like element extending from the opening. In this fashion, the filter area is greatly increased. However, it is quite expensive to provide such a sleeve from the manufacturing standpoint because of the expense of mounting it on the U-tube. This problem has been overcome in the present invention by the structure best illustrated in FIG. 2. As will be noted, a wall portion 38 in the tube bend 24 is deformed inwardly to form a recess 40 having a diameter at the mouth as measured between points 42, 44 which is several times the diameter of the opening 36. The opening is effectively offset from the mouth of the recess 40. The opening 36 and recess 40 may be formed simultaneously by means of a punching and forming tool.

A strainer element 46 in the shape of a sleeve-type wire mesh screen is slipped over one of the legs of the U-tube and positioned at the tube bend 24.

As will be noted in FIG. 2, a portion 48 of the strainer element 46 overlies the mouth of the recess 40. The area defined by the portion 48 for straining purposes is considerably greater than the area of the opening 36 which would be available if the opening 36 were positioned directly against the strainer element. The strainer element may be fabricated of a suitable material such as copper or brass or preferably monel or steel. By using monel or steel, the strainer may be hydrogen copper brazed directly to the tube at the same time the complete assembly is brazed. The strainer element 46 may be secured in place by brazing the ends 50, 52. Additionally, the strainer element 46 may be cut on a bias so that the upper portion will fit the inner diameter of the tube end 24 with the lower portion thereof fitting the outer diameter of the tube bend 24.

Provision of the recess 40 permits a great increase in the amount of filter area relative to using the opening 36 to defining the total filter area, it being appreciated that the area is a function of the square of the diameter. In one actual embodiment, the actual filter area was approximately fifty times greater by use of recess 40, than it would have been had the opening 36 been directly pressed against the filtering screen. While the invention has been shown in use in connection with a suction accumulator 10, it will be appreciated that the filtering structure may be used in any application where it would be useful.

What I claim as my invention is:

1. In a suction accumulator for the compressor of a refrigeration system, said accumulator comprising a casing having an inlet and an outlet, a conduit within the casing having an open end adjacent the upper portion of the casing and having a portion extending from said open end to a point adjacent the bottom of the casing and thence to the casing outlet, said conduit having a metering opening adjacent the bottom of the casing, said conduit acting to draw gas through said open end thereof and draw liquid at a controlled rate through said metering opening therein and expel both the gas and the liquid into the casing outlet, the improvement comprising a radially inwardly directed recess in a wall portion of said conduit adjacent the bottom of the casing, said metering opening being located within said recess, and a sleeve-shaped strainer element received on said conduit and positioned adjacent the bottom of the casing in a location where a portion of said strainer element overlies said recess so as to filter fluid flowing through said strainer before it passes through said metering opening.

2. A suction accumulator as defined in claim 1, further characterized in that said strainer element is fixedly secured to said conduit.

3. An accumulator as defined in claim 1, further characterized in that said strainer element is fabricated of foraminous sheet material.

* * * * *